US008849661B2

(12) United States Patent
Tanioka et al.

(10) Patent No.: US 8,849,661 B2
(45) Date of Patent: Sep. 30, 2014

(54) METHOD AND SYSTEM FOR ASSISTING INPUT OF TEXT INFORMATION FROM VOICE DATA

(75) Inventors: Hideaki Tanioka, San Jose, CA (US); Daisuke Ito, Sunnyvale, CA (US); Hidenobu Ito, Kanagawa (JP)

(73) Assignee: Fujitsu Limited, Kawasaki-shi (JP)

( * ) Notice: Subject to any disclaimer, the term of this patent is extended or adjusted under 35 U.S.C. 154(b) by 681 days.

(21) Appl. No.: 12/780,344

(22) Filed: May 14, 2010

(65) Prior Publication Data

US 2011/0282664 A1    Nov. 17, 2011

(51) Int. Cl.
G10L 15/00    (2013.01)
G06F 17/27    (2006.01)
G06F 3/0488   (2013.01)
G06F 3/0486   (2013.01)
G10L 15/26    (2006.01)
G06F 17/21    (2006.01)

(52) U.S. Cl.
CPC .............. *G10L 15/26* (2013.01); *G06F 17/277* (2013.01); *G06F 3/04883* (2013.01); *G06F 3/0486* (2013.01); *G06F 17/218* (2013.01)
USPC ........................................................ 704/235

(58) Field of Classification Search
USPC ........................................................ 704/235
See application file for complete search history.

(56) References Cited

U.S. PATENT DOCUMENTS

| 5,802,460 | A   | * | 9/1998  | Parvulescu et al. ............. 455/92 |
| 5,841,969 | A   | * | 11/1998 | Fye ................................. 714/56 |
| 7,072,941 | B2  | * | 7/2006  | Griffin et al. .................. 709/204 |
| 8,091,029 | B1  | * | 1/2012  | Gay et al. ....................... 715/734 |
| 2003/0028380 | A1 | * | 2/2003 | Freeland et al. ............... 704/260 |
| 2004/0015547 | A1 | * | 1/2004 | Griffin et al. ................. 709/204 |
| 2004/0015553 | A1 | * | 1/2004 | Griffin et al. ................. 709/206 |
| 2004/0081296 | A1 | * | 4/2004 | Brown et al. ............... 379/88.14 |
| 2004/0083101 | A1 | * | 4/2004 | Brown et al. ................. 704/235 |
| 2005/0114254 | A1 | * | 5/2005 | Condie .......................... 705/37 |
| 2006/0056599 | A1 | * | 3/2006 | Cragun ....................... 379/67.1 |
| 2007/0100626 | A1 | * | 5/2007 | Miller et al. .................. 704/258 |
| 2007/0294078 | A1 | * | 12/2007 | Kim et al. ........................ 704/2 |
| 2008/0221880 | A1 | * | 9/2008 | Cerra et al. .................... 704/235 |
| 2012/0191796 | A1 | * | 7/2012 | Griffin et al. ................. 709/206 |
| 2013/0317994 | A1 | * | 11/2013 | Tran ............................. 705/310 |

* cited by examiner

*Primary Examiner* — Michael N Opsasnick
(74) *Attorney, Agent, or Firm* — Baker Botts L.L.P.

(57) ABSTRACT

A method may include converting voice data into text data and tagging at least one portion of the text data with at least one tag, the at least one tag indicating that the at least one portion of the text data includes a particular type of data. The method may also include displaying the text data on a display such that the at least one portion of text data is displayed with at least one associated graphical element indicating that the at least one portion of text data is associated with the at least one tag. The at least one portion of text data may be a selectable item on the display allowing a user interfacing with the display to select the at least one portion of text data in order to apply the at least one portion of text data to an application.

20 Claims, 11 Drawing Sheets

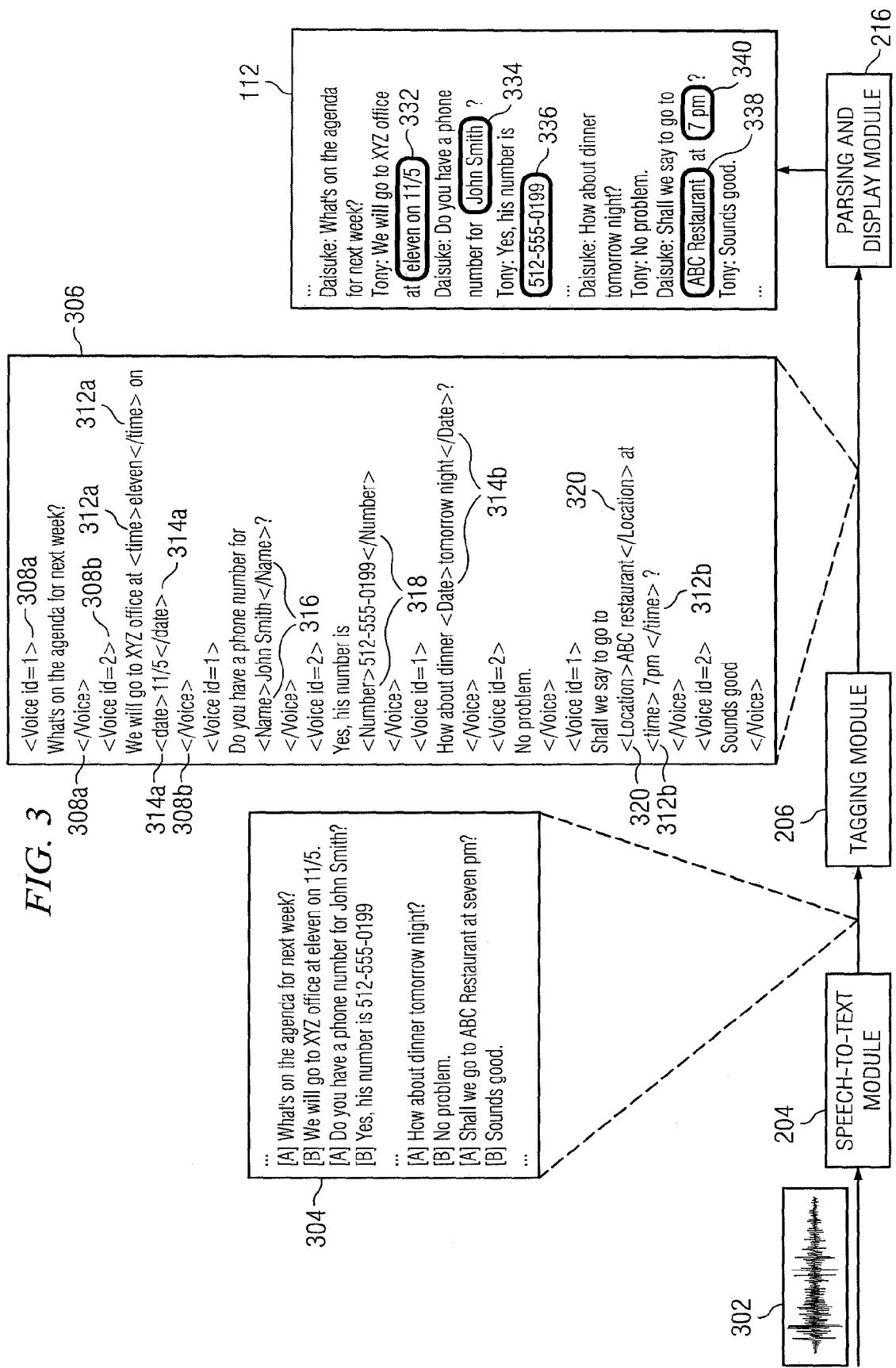

US 8,849,661 B2

METHOD AND SYSTEM FOR ASSISTING INPUT OF TEXT INFORMATION FROM VOICE DATA

TECHNICAL FIELD

This disclosure relates in general to communication systems and more particularly to a method and system for assisting the input of text information from voice data.

BACKGROUND

Individuals participating in telephonic conversations often share information. In many instances, these conversations include information that one or more individuals deem "important" and thus may desire to have such information recorded in writing (e.g., appointment time, location, contact names and phone numbers, etc.). Historically, to retain such information received during a telephonic conversation, an individual would often manually record the information while having the conversation. Such manual recording may lead to distraction which may cause the individual to miss some information or otherwise lose concentration from the conversation. In addition, if the individual desires that the recorded information be in digital format (e.g., stored in a digital device such as a cellular phone, smart phone, personal digital assistant, or personal computer) the individual must often also manually enter the information into a digital device.

SUMMARY OF THE DISCLOSURE

The present disclosure provides methods and systems for providing services and/or computing resources that substantially eliminates or reduces at least some of the disadvantages and problems associated with previous methods and systems.

A method may include converting voice data into text data and tagging at least one portion of the text data in the text conversion file with at least one tag, the at least one tag indicating that the at least one portion of the text data includes a particular type of data. The method may also include displaying the text data on a display such that the at least one portion of text data is displayed with at least one associated graphical element indicating that the at least one portion of text data is associated with the at least one tag. The at least one portion of text data may be a selectable item on the display allowing a user interfacing with the display to select the at least one portion of text data in order to apply the at least one portion of text data to an application.

Technical advantages of certain embodiments of the present disclosure include a mechanism whereby the input of information uttered during a telephonic conversation into a client device is streamlined, thus reducing time associated with such data entry and reducing the risk of human error in performing such data entry.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates conversion of voice data from a telephonic conversation to a display of tagged text, in accordance with certain embodiments of the present disclosure;

DETAILED DESCRIPTION OF THE INVENTION

Embodiments and their advantages are best understood by reference to FIGS. 1-10, wherein like numbers are used to indicate like and corresponding parts.

Figure 1:
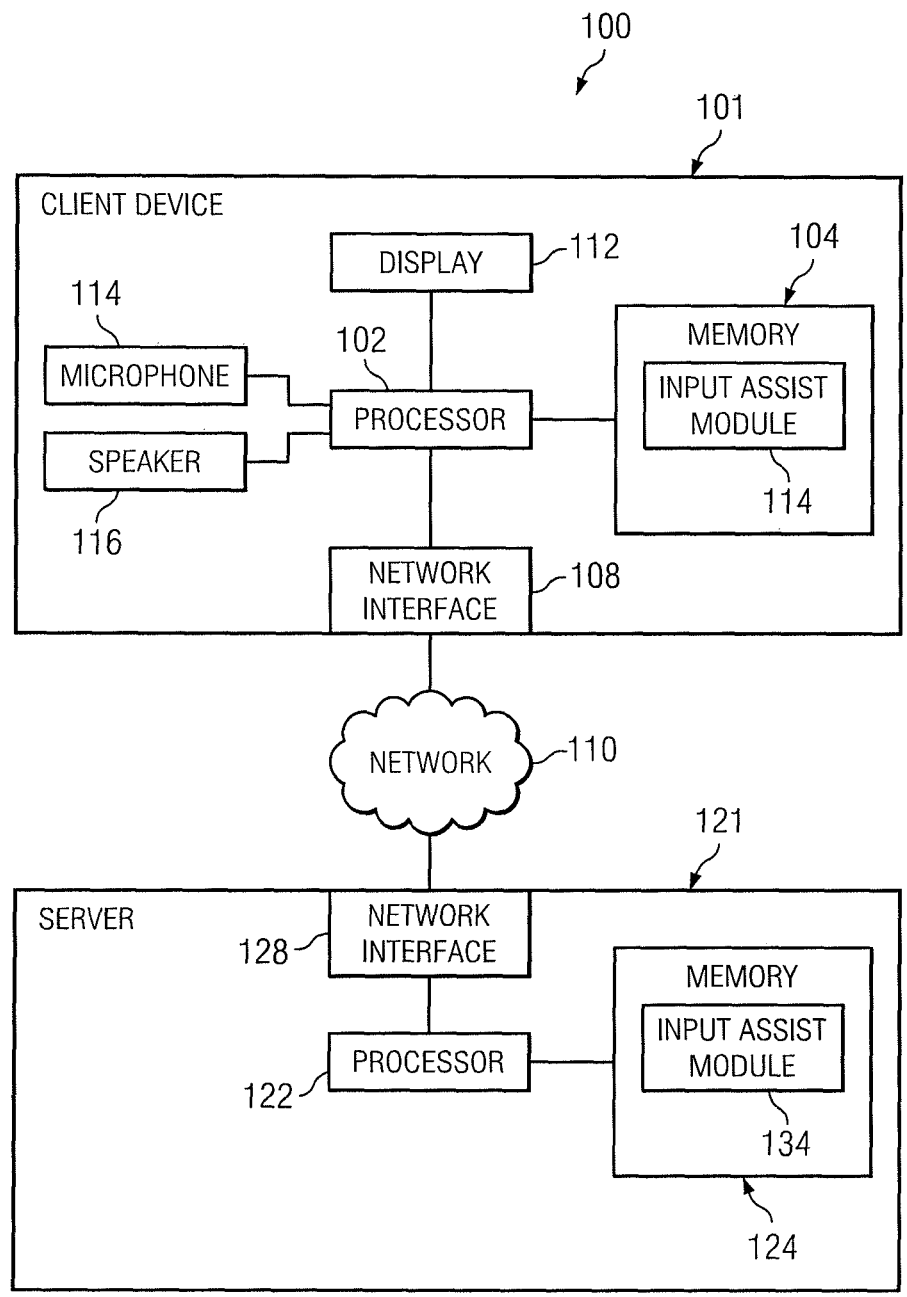
FIG. 1 illustrates a block diagram of an example system for assisting the input of text information from voice data, in accordance with certain embodiments of the present disclosure.

FIG. 1 illustrates a block diagram of an example system 100 for assisting the input of text information from voice data, in accordance with certain embodiments of the present disclosure. As depicted in FIG. 1, system 100 may include a client device 101, a network 110, and a server 121. Client device 101 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, client device 101 may be a personal computer, a smart phone (e.g., a Blackberry or iPhone), a personal digital assistant, or any other suitable device and may vary in size, shape, performance, functionality, and price.

As shown in FIG. 1, client device 101 may include a processor 102, a memory 104, a network interface 108, a microphone 115, and a speaker 116.

Processor 102 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of client device 101. In the same or alternative embodiments, processor 102 may communicate data for display to a user on display 112.

Memory 104 may be communicatively coupled to processor 102 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to client device 101 is turned off. As shown in FIG. 1, memory 104 may have stored thereon input assist module 114. Generally speaking, input assist module 114 may be a program of instructions configured to, when read from memory 104 and executed by processor 102, assist a user of client device 101 in inputting information received in a telephonic conversation for storage on client device 101 (or other device). The architecture and functionality of input assist module 114 is discussed in greater detail with respect to FIGS. 2A-10 below.

Network interface 108 may include any suitable system, apparatus, or device operable to serve as an interface between client device 101 and network 110. Network interface 108 may enable client device 101 to communicate over network 110 using any suitable transmission protocol and/or standard, including without limitation all transmission protocols and/or standards enumerated below with respect to the discussion of network 110. Network interface 108 and its various components may be implemented using hardware, software, or any combination thereof.

Display 112 may be coupled to processor 102 and may include any system, apparatus, or device suitable for creating images (e.g., geometric shapes and/or alphanumeric characters) recognizable to a user. In addition, in some embodiments, display 112 may be configured to detect the presence and/or location of a tactile touch on or proximate to the display 112. Display 112 may include, for example, a liquid crystal display (LCD), a light-emitting diode (LED) display, or an organic LED display, and may employ any suitable mechanism for detecting the presence and/or location of a tactile touch, including, for example, resistive sensing, capacitive sensing, surface acoustic wave, projected capacitance, infrared, strain gauge, optical imaging, dispersive signal technology, or acoustic pulse recognition.

Microphone 115 may be communicatively coupled to processor 102 and may include an acoustic-to-electric transducer and/or sensor configured to converts sound into an electrical signal (e.g., sounds produced by the voice of a user of client device 101).

Speaker 116 may include any system, apparatus, or device suitable for outputting sound signals generated by client device 101. In certain embodiments, speaker 116 may include an audio driver operable to control the one or more speakers and/or act as a translator between processor 102 and audio output device 122.

Network 110 may be a network and/or fabric configured to communicatively couple client device 101 to server 121 and/or other devices. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), a cellular communications network, an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Ethernet Asynchronous Transfer Mode (ATM), Internet protocol (IP), Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), Integrated Digital Enhanced Network (iDEN), other packet-based protocol, and/or any combination thereof. Network 110 and its various components may be implemented using hardware, software, or any combination thereof.

Server 121 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Server 121 may be a computer or any other suitable device and may vary in size, shape, performance, functionality, and price. As shown in FIG. 1, server 121 may include a processor 122, a memory 123, and a network interface 128.

Processor 122 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 122 may interpret and/or execute program instructions and/or process data stored in memory 124 and/or another component of server 121.

Memory 124 may be communicatively coupled to processor 122 and may comprise any system, device, or apparatus configured to retain program instructions or data for a period of time (e.g., computer-readable media). Memory 124 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to server 121 is turned off. As shown in FIG. 1, memory 124 may have stored thereon input assist module 134. Generally speaking, input assist module 134 may be a program of instructions configured to, when read from memory 124 and executed by processor 122, assist a user of client device 101 in inputting information received in a telephonic conversation for storage on client device 101 (or other device). The architecture and functionality of input assist modules 134 are discussed in greater detail with respect to FIGS. 2A-10 below.

Network interface 128 may include any suitable system, apparatus, or device operable to serve as an interface between server 121 and network 110. Network interface 128 may enable server 121 to communicate over network 110 using any suitable transmission protocol and/or standard, including without limitation all transmission protocols and/or standards enumerated above with respect to the discussion of network 110. Network interface 108 and its various components may be implemented using hardware, software, or any combination thereof.

Figure 2A:
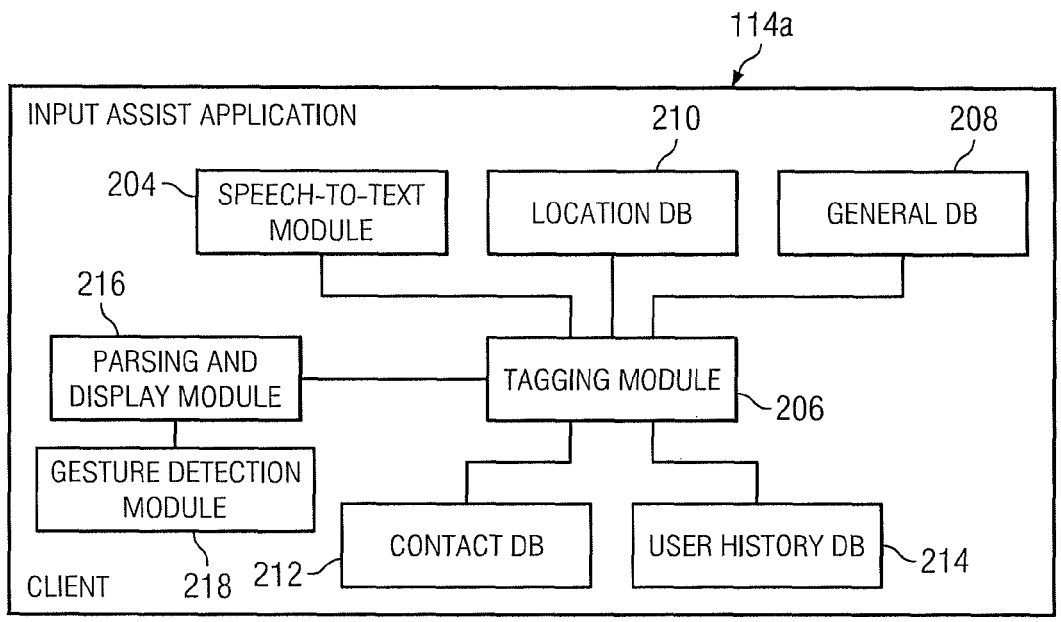
FIGS. 2A-2C illustrate selected components of various embodiments of input assist modules, in accordance with certain embodiments of the present disclosure.
Figure 2B:
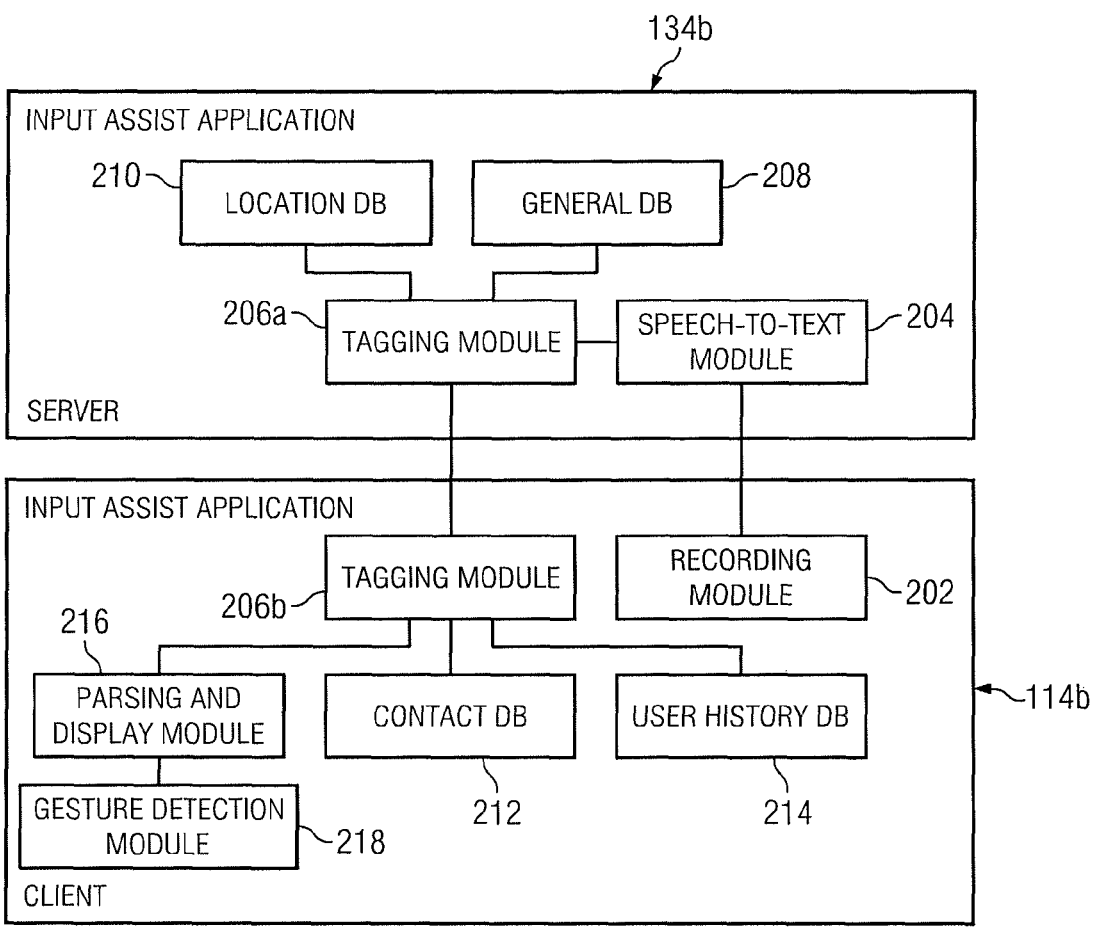
Figure 2C:
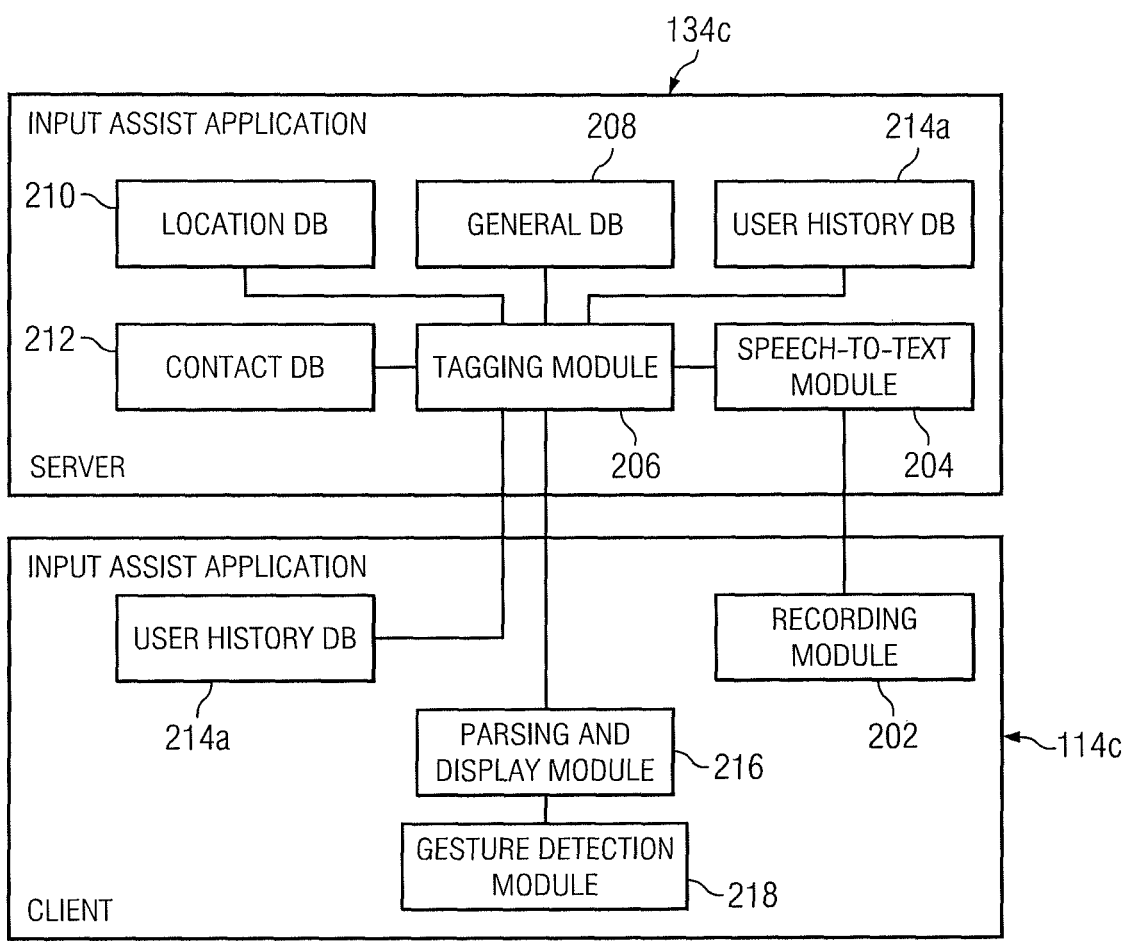

FIGS. 2A-2C illustrate selected components of various embodiments of input assist modules 114 and 134, in accordance with certain embodiments of the present disclosure.

For example, FIG. 2A illustrates a single mode or client-only mode embodiment of input assist module 114a, in which input assist functionality is performed substantially entirely on client device 101 (e.g., an input assist module 134 is not used or is of limited functionality). FIG. 2B illustrates a hybrid or client and server mode embodiment of input assist modules 114b and 134b, in which input assist functionality is distributed between client device 101 and server 121. FIG. 2C illustrates an alternative hybrid or client and server mode embodiment of input assist modules 114c and 134c, in which input assist functionality is distributed between client device 101 and server 121. As shown in FIGS. 2A-2C, input assist modules 114 and 134 may comprise, either alone or in combination with one another, a recording module 202, a speech-to-text module 204, one or more tagging modules 206, a general database 208, a location database 210, a contact database 212, one or more user history databases 214, a parsing and display module 216, and a gesture detection module 218.

Recording module 202 is depicted as being present in the hybrid mode embodiments of input assist module 114b and 114c depicted in FIGS. 2B and 2C. Recording module 202 may be a program of instructions which may be configured to, when executed by processor 102, record a telephonic conversation conducted by a user of client device 101 and store such conversation (e.g., as an audio file) on memory 104 and/or may communicate such conversation via network 110 to be stored on memory 124. In the embodiment depicted in FIG. 2A, a recording module 202 integral to input assist module 114 is not present. In such embodiment, a telephonic conversation may be converted to text by speech-to-text module 204 "on the fly" without the necessity of recording and/or storage of the conversation. Nonetheless, in certain embodiments of the client-only mode of input assist module 114, a recording module 202 may be present.

Speech-to-text module 204 may be, dependent upon the embodiment utilized, a part of either input assist module 114 or input assist module 134. Speech-to-text module 204 may be a program of instruction which may be configured to, when executed by processor 102 or processor 122, translate voice data representing a telephonic conversation into text (e.g., alphanumeric characters). In certain embodiments, speech-to-text module 204 may also store such translation on memory 104 or memory 124. In embodiments in which recording module 202 is present, speech-to-text module 204 may be configured to read voice data stored on one or more of memory 104 or memory 124 in order to convert such stored data to text. In embodiments in which recording module 202 is not present, speech-to-text module 204 may be configured to convert a telephonic conversation to text "on the fly" during the conversation. In addition to converting voice data into text, speech-to-text module 204 may also be configured to determine the portions of the telephonic conversation uttered by each participant of the conversion (e.g., in a two-way conversation, identifying the portion of the conversation spoken by the user of client device 101, and the portion of the conversation spoken by the other participant of the telephonic conversation).

Tagging module 206 (including each of tagging modules 206a and 206b shown in FIG. 2B) may be configured to read text data produced by speech-to-text module 204 and tag one or more portions of the text data based on information stored in one or more of general database 208, location database 210, contact database 212, user history database 214 (including user history databases 214a and 214b), and any other database or source of information. Information tagged by tagging module 206 may include biographical information (e.g., name, address, phone number, email address, etc.), geographical information (e.g., location of a person or a place), temporal information (e.g., time and data), and/or other information.

General database 208 may include a database, table, list, map, or any other suitable data structure including words, strings or phrases that may, if present in a text conversion of a telephonic conversation, refer to a person, time, or location (e.g., first names or surnames of individuals, geographic locations, dates, times, phone numbers, etc.). Thus, in operation, if a word, phrase, or a collection or words and phrases present in general database 208 also appears in the text conversion of a telephonic conversation, tagging module 206 may tag such word or phrase within the text conversion. Such tag may also indicate the type of data being tagged (e.g., "name," "date," "time," "location," "phone," "email" etc.).

Location database 210 may include a database, table, list, map, or any other suitable data structure including words, strings or phrases that may, if present in a text conversion of a telephonic conversation, refer to a location (e.g., a shop, restaurant, mass transit depot, landmark, address, etc.) proximate to the geographic location of the user of client device 101. Thus, in operation, if a word, phrase, or a collection or words and phrases present in location database 210 also appears in the text conversion of a telephonic conversation, tagging module 206 may tag such word or phrase within the text conversion. Such tag may also indicate the type of data being tagged (e.g., "location," etc.).

Contact database 212 may include a database, table, list, map, or any other suitable data structure including words, strings or phrases that may, if present in a text conversion of a telephonic conversation, refer to contact information (e.g., biographical and/or contact information such as a name, address, telephone number, email address, etc.) of an individual known to a user of client device 101. Thus, in operation, if a word, phrase, or a collection or words and phrases present in contact database 212 also appears in the text conversion of a telephonic conversation, tagging module 206 may tag such word or phrase within the text conversion. Such tag may also indicate the type of data being tagged (e.g., "name," "address," "phone," "email," etc.).

User history database 214 (including user history databases 214a and 214b) may include a database, table, list, map, or any other suitable data structure including words, strings or phrases that may, if present in a text conversion of a telephonic conversation, refer to information associated with the activity history of the user of client device 101 (e.g., words the user often uses in applications of client device 101). Thus, in operation, if a word, phrase, or a collection or words and phrases present in user history database 214 also appears in the text conversion of a telephonic conversation, tagging module 206 may tag such word or phrase within the text conversion. Such tag may also indicate the type of data being tagged (e.g., "name," "address," "phone," "email," "location," etc.).

In addition to tagging based on information appearing in databases 208, 210, 212, and 214, tagging module 206 may also detect patterns and tag data stored in a text conversion of a telephonic conversation based on such detected patterns. For example, if tagging module determines that seven or ten numbers appear consecutively in a text conversion, such pattern of numbers may represent a phone number, and tagging module 206 may tag such pattern of numbers as a phone number. As another example, if tagging module 206 determines that a word is followed by the word "at," then another word, then the word "dot," then the word "com" (or "net,"

"org," "E-D-U", etc.), such pattern of words may represent an email address, and tagging module 206 may tag such pattern of words as an email address.

Parsing and display module 216 may be a program of instructions which may be configured to, when executed by processor 102, parse a tagged text file produced by tagging module 206 and render graphics to display 112 based on such parsing. For example, parsing and display module 216 may display the text conversion of a telephonic conversation to display 112, with one or more portions of such text being displayed with associated graphical elements or characteristics (e.g., highlighting, bold, italics, underlining, circles, rectangles, etc.) indicating that the particular portions of text have been tagged by tagging module 206.

Gesture detection module 218 may be a program of instructions which may be configured to, when executed by processor 102, detect the tactile interactions of a user with display 112 to determine if a user has indicated a desire to undertake an action with respect to a particular tagged item of text.

The functionality and characteristics of modules 202, 204, 206, 216, and 218 are described in greater detail below with respect to FIGS. 3-10.

FIG. 3 illustrates conversion of voice data from a telephonic conversation to a display of tagged text, in accordance with certain embodiments of the present disclosure. As shown in FIGURE, speech-to-text module 204 may convert a telephonic conversation (either "on the fly" or recorded by recording module 202) into a text conversion file 304, and may store text conversion on memory 104 and/or memory 124. As shown in FIG. 3, speech-to-text module 204 may also indicate within text conversion file 304 the portions of speech uttered by the individual participants of the telephonic conversation, as shown by "[A]" and "[B]" in FIG. 3.

Tagging module 206 may read text conversion 304 and based on contents of databases 208, 210, 212, 214, other databases, and/or other sources of information, convert text conversion file 304 into tagged text conversion file 306. As shown in FIG. 3, tagging module 206 may tag one or more portions of the text associated with the telephonic conversation and embed such tags in the text. For example, tagging module 206 may label the portions of the conversation spoken by individual participants with a voice tag 308 (e.g., one participant assigned tag "Voice id=1" (tag 308a) and the other participant assigned tag "Voice id=2" (tag 308b)). As another example, tagging module 206 may label portions of the conversation associated with a time of day with a date tag 312 (e.g., the time "eleven" may be labeled with time tag 312a and the time "7 pm" may be labeled with time tag 312b). As an additional example, tagging module 206 may label portions of the conversation associated with a date with a date tag 314 (e.g., the date "11/5" may be labeled with date tag 314a and the date "tomorrow night" may be labeled with date tag 314b). As a further example, tagging module 206 may label portions of the conversation associated with a name with a name tag 316 (e.g., the name "John Smith" may be labeled with name tag 316). As yet another example, tagging module 206 may label portions of the conversation associated with a phone number with a phone number tag 318 (e.g., the phone number "512-555-0199" may be labeled with phone number tag 318). As yet another example, tagging module 206 may label portions of the conversation associated with a location with a location tag 320 (e.g., the location "ABC restaurant" may be labeled with location tag 320).

As depicted in FIG. 3, parsing and display module 216 may read tagged text conversion file 306, and based on the contents of tagged text conversion file 306, display the text conversion of the telephonic conversation to display 112, with one or more portions of such text being displayed with associated graphical elements or characteristics (e.g., highlighting, bold, italics, underlining, circles, rectangles, etc.) indicating that the particular portions of text are associated with tags. For example, parsing and display module 216 may render a graphical element 332 to display 112 indicating that "eleven on 11/5" is associated with one or more tags provided by tagging module 206. As further examples, parsing and display module may render graphical elements 334, 336, 338 and 340 to display 112 indicating that "John Smith," "512-555-0199," "ABC restaurant," and "7 pm," respectively, are associated with one or more tags provided by tagging module 206.

Figure 4:
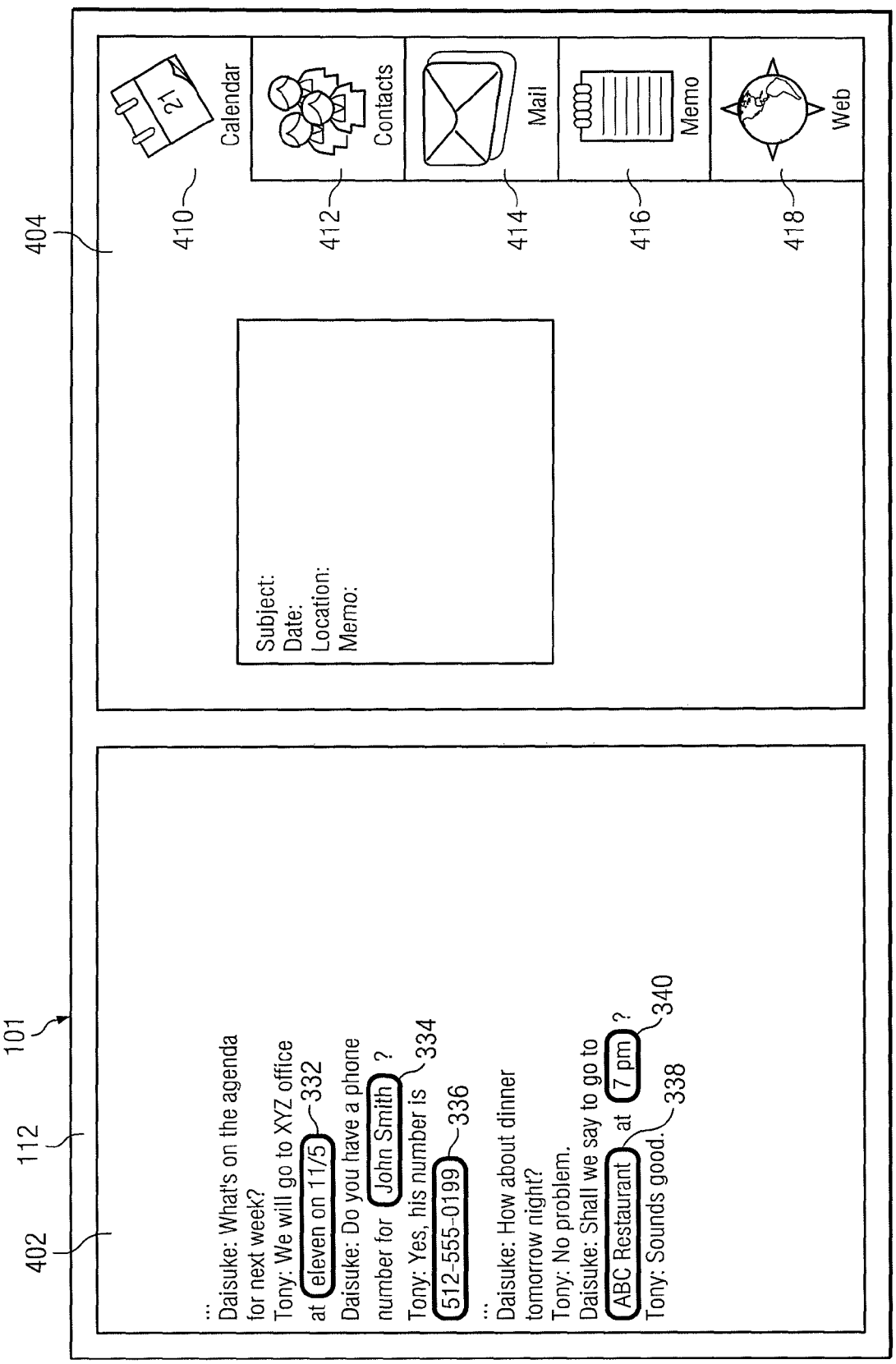
FIG. 4 illustrates an example display of tagged text information on a client device, in accordance with certain embodiments of the present disclosure.

FIG. 4 illustrates an example display of tagged text information on client device 101, in accordance with certain embodiments of the present disclosure. As shown in FIG. 4, when displaying a text conversion of a telephonic conversation, parsing and display module 216 (or another component of client device 101) may render a conversation pane 402 and an application pane 404 to display 112. Conversation pane 402 may include the text conversion of a telephonic conversation, including the various graphical elements 332, 334, 336, 338, and 340 associated with tags provided by tagging module 206. Application pane 404 may display to a user one or more applications to which tagged data represented by graphical elements 332, 334, 336, 338, and/or 340 may be applied. For example, tagged data may be applied to a calendar application (represented by tab 410 of application pane 404), a contacts application (represented by tab 412 of application pane 404), a mail application (represented by tab 414 of application pane 404), a memo application 416 (represented by tab 416 of application pane 404), and a web application (represented by tab 418 of application pane 404). As is described in greater detail below with respect to FIGS. 5-7, graphical elements 332, 334, 336, 338, and 340 may be selectable and/or draggable such that a user of client device 101 may drag one or more graphical elements from conversation pane 402 to application pane 404 to apply tagged data to a particular application.

Figure 5:
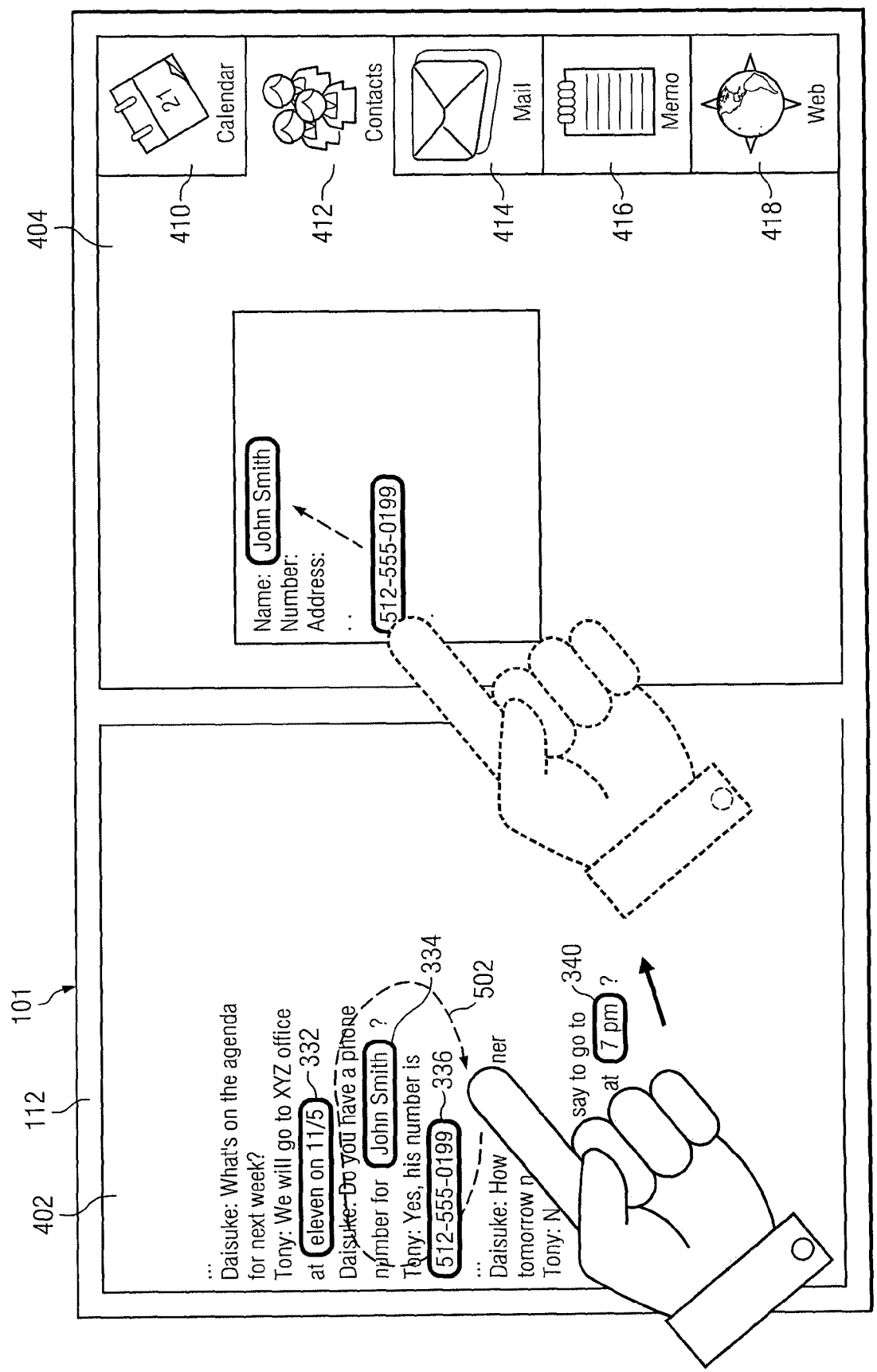
FIG. 5 illustrates an example method of inputting contact information from a telephonic conversation to a client device, in accordance with certain embodiments of the present disclosure.

FIG. 5 illustrates an example method of inputting contact information from a telephonic conversation to client device 101, in accordance with certain embodiments of the present disclosure. As shown in FIG. 5, a user interacting with display 112 may draw a geometric shape 502 (e.g., circle, rectangle, etc.) around related graphical elements (in this example, graphical elements 334 and 336 including the name and phone number for John Smith) in conversation pane 402. Gesture detection module 218 may detect such action by the user and, in response, may cause parsing and display module 216 to determine that contact information has been selected in conversation pane 402. As a result of determining contact information has been selected, parsing and display module 216 may display contact tab 412 and the contact application in application pane 404, and the user may perform an action (e.g., a drag and drop of graphical elements 334 and 336 individually or together as one selection) in order to cause the information (e.g., the information represented by graphical elements 334 and 336) to be stored in the user's contacts.

Figure 6:
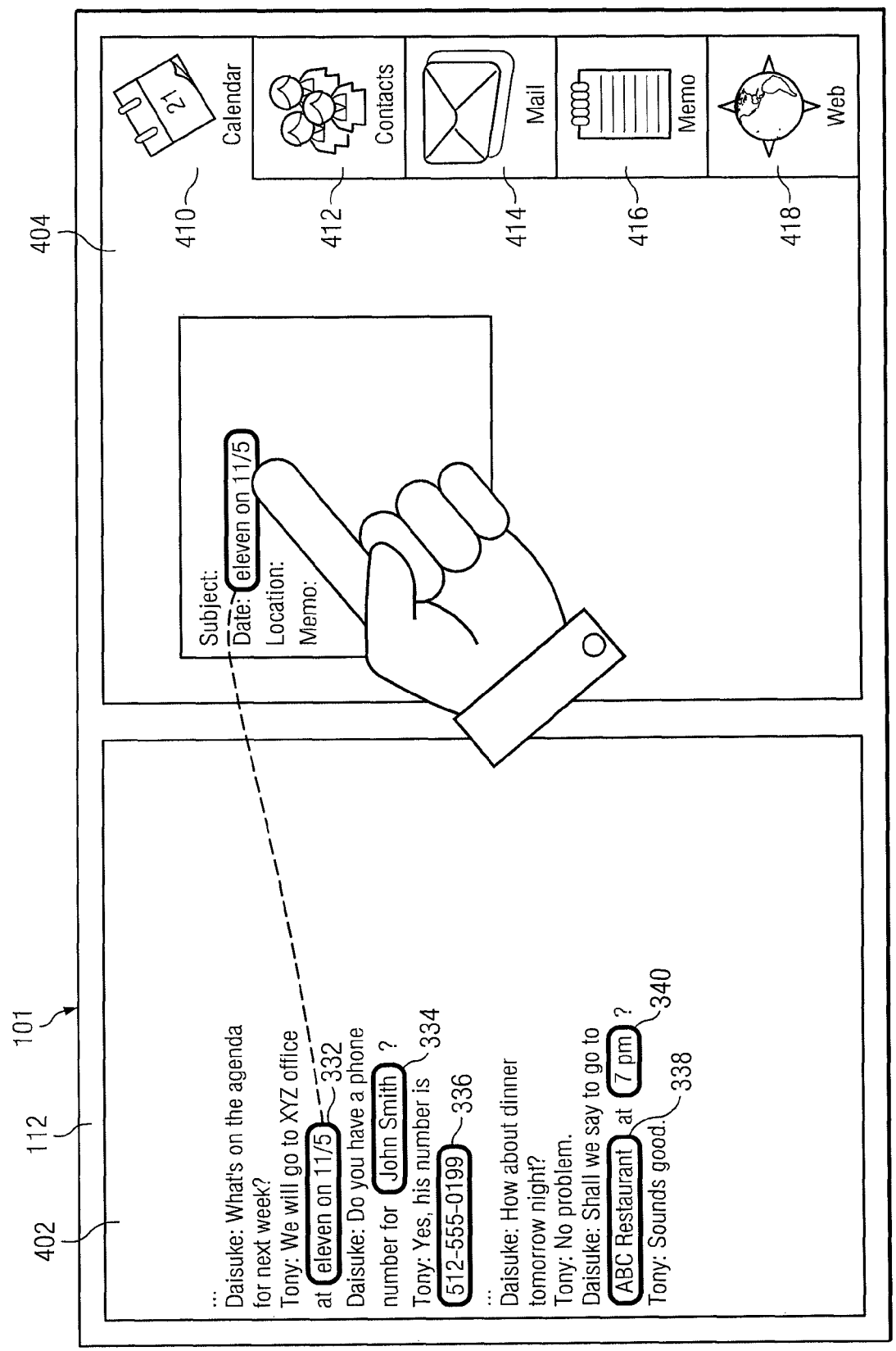
FIG. 6 illustrates an example method of inputting appointment information from a telephonic conversation to a client device, in accordance with certain embodiments of the present disclosure.

FIG. 6 illustrates an example method of inputting appointment information from a telephonic conversation to client device 101, in accordance with certain embodiments of the present disclosure. As shown in FIG. 6, a user interacting with display 112 may drag a graphical element (e.g., graphical element 332 including a date and time) from conversation pane 402 to application pane 404. Gesture detection module 218 may detect such action by the user and, in response, may cause parsing and display module 216 to determine that scheduling information has been selected in conversation pane 402. As a result of determining scheduling information has been selected, parsing and display module 216 may display calendar tab 410 and the calendar application in application pane 404, and the user may perform an action (e.g., a drop) in order to cause the information (e.g., the information represented by graphical element 332) to be stored in the user's calendar, after which the user may enter additional information about the calendar item.

Figure 7:
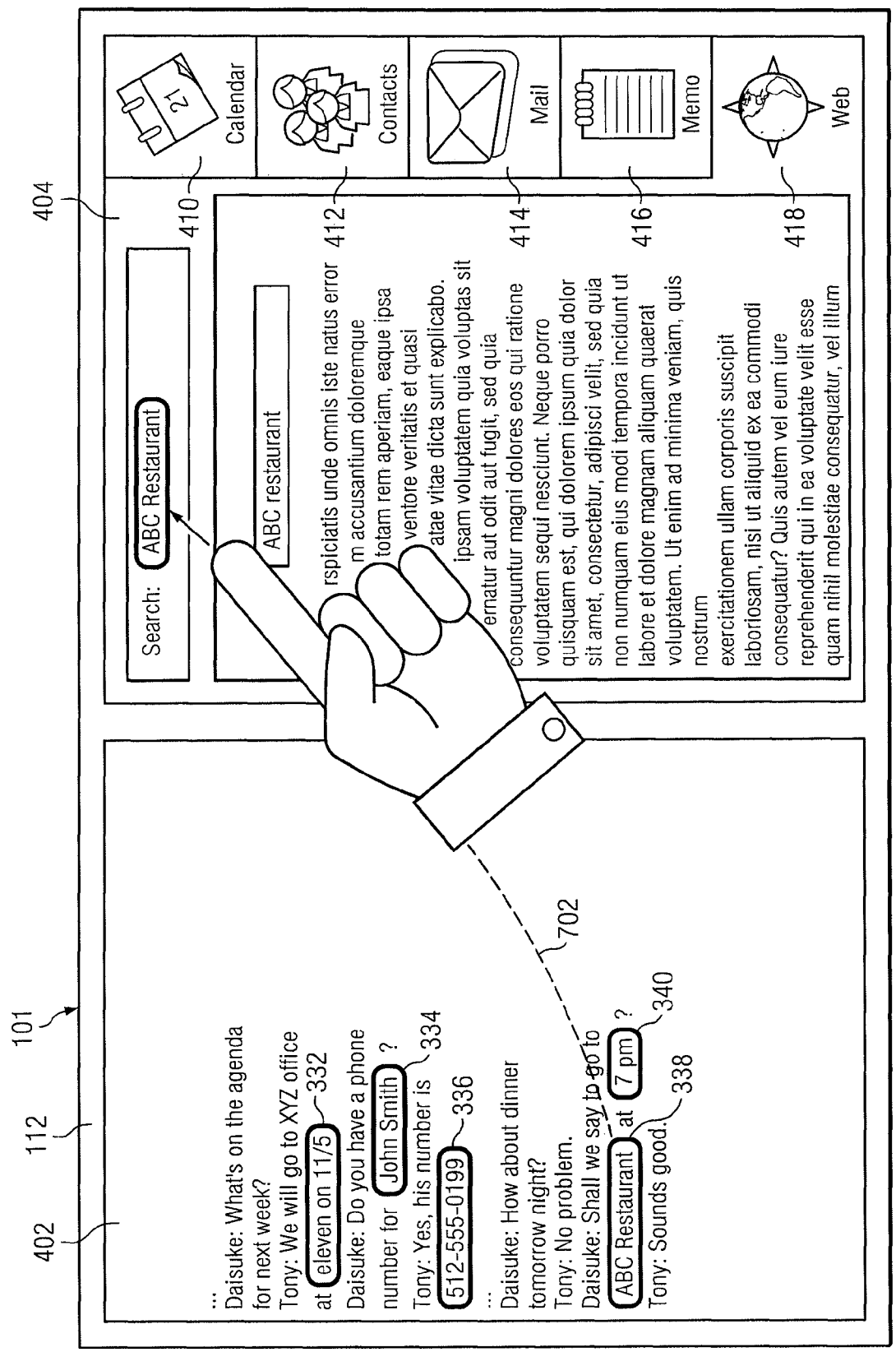
FIG. 7 illustrates an example method of inputting location information from a telephonic conversation into a search engine on a client device, in accordance with certain embodiments of the present disclosure.

FIG. 7 illustrates an example method of inputting location information from a telephonic conversation into a search engine on client device 101, in accordance with certain embodiments of the present disclosure. As shown in FIG. 7, a user interacting with display 112 may drag a graphical element (e.g., graphical element 338 including a location) from conversation pane 402 to application pane 404. Gesture detection module 218 may detect such action by the user and, in response, may cause parsing and display module 216 to determine that location information has been selected in conversation pane 402. As a result of determining location information has been selected, parsing and display module 216 may display web tab 418 and the web application in application pane 404 and may preload a search engine into a web browser launched in the application pane, and the user may perform an action (e.g., a drop) in order to cause the information (e.g., the information represented by graphical element 338) to be entered into a field of the search engine, allowing the user to perform a search regarding the location.

In the discussion of the examples of FIGS. 5-7 above, parsing and display module 216 display a tab and application in application pane 404 based on the type of information selected in conversation pane 402. However, in some embodiments of the present disclosure, a user of client device 101 may select a different tab and application that that automatically selected by input assist application 114. For example, referring again to the example in FIG. 6, a user may drag element 332 (including a date and time) onto a tab or otherwise select a tab other than calendar tab 410 (e.g., mail application tab 414), and the corresponding application may instead appear in application pane 404 with the selected data applied to it.

Figure 8:
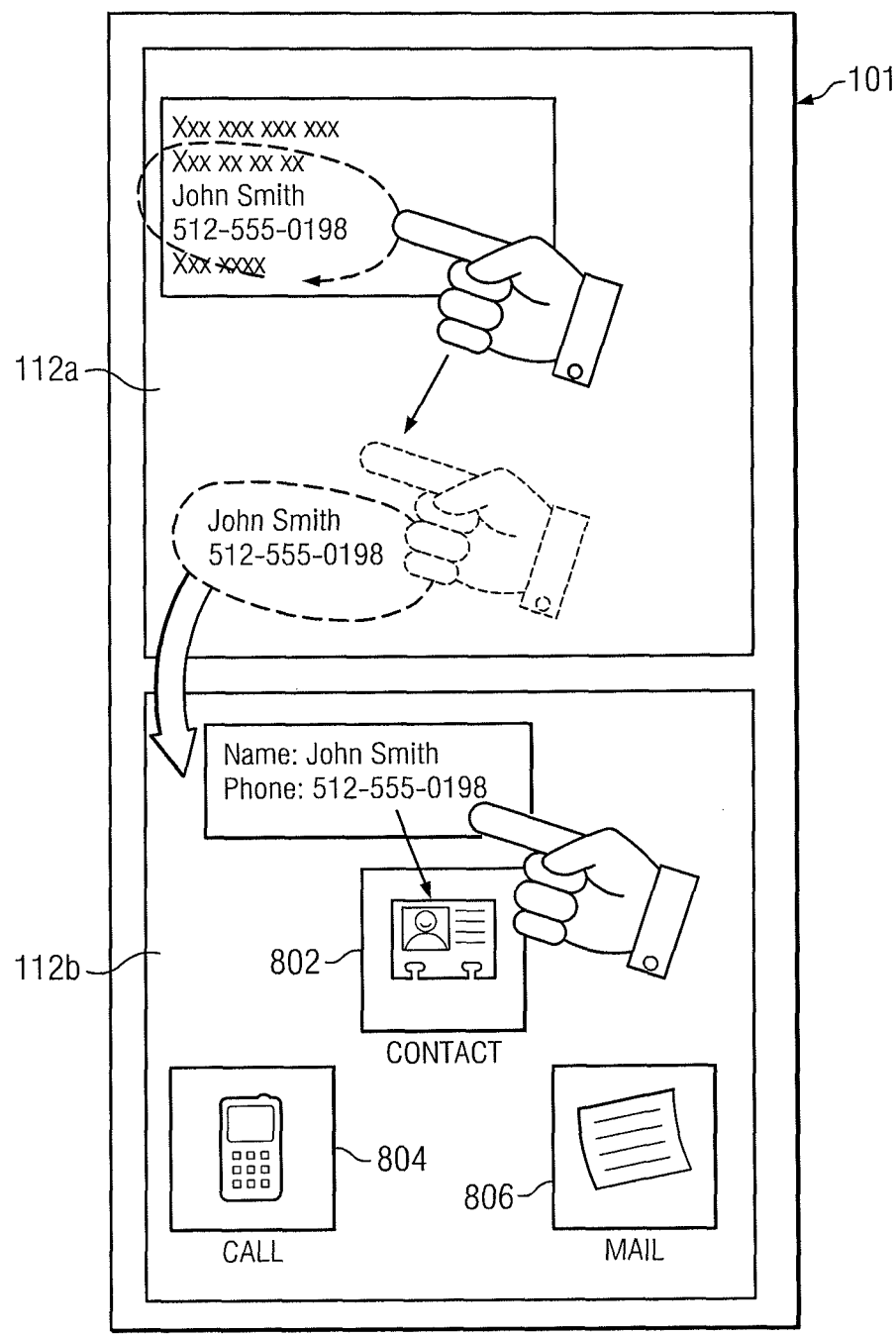
FIG. 8 illustrates an example method of inputting contact information from a telephonic conversation on a dual-display client device, in accordance with certain embodiments of the present disclosure.

FIG. 8 illustrates an example method of inputting contact information from a telephonic conversation on a dual-display client device 101, in accordance with certain embodiments of the present disclosure. Client device 101 may be similar to client device depicted in FIGS. 1-7 of this disclosure, except that client device 101 depicted in FIG. 8 may have two displays 112a and 112b. As shown in FIG. 8, a user interacting with display 112a may draw a geometric shape (e.g., circle, rectangle, etc.) around related graphical elements (in this example, graphical elements including the name and phone number for a person) to select such items in display 112a and may drag or flick such items towards display 112b. Gesture detection module 218 may detect such action by the user and, in response, may cause parsing and display module 216 to determine that contact information has been selected in display 112a. As a result of determining contact information has been selected, parsing and display module 216 may show icons for related applications (e.g., contact icon 802, phone call icon 804, email icon 806, etc.). A user may then launch an application and apply the selected items to the application by dragging and dropping the selected items onto the icon for the desired application.

Figure 9:
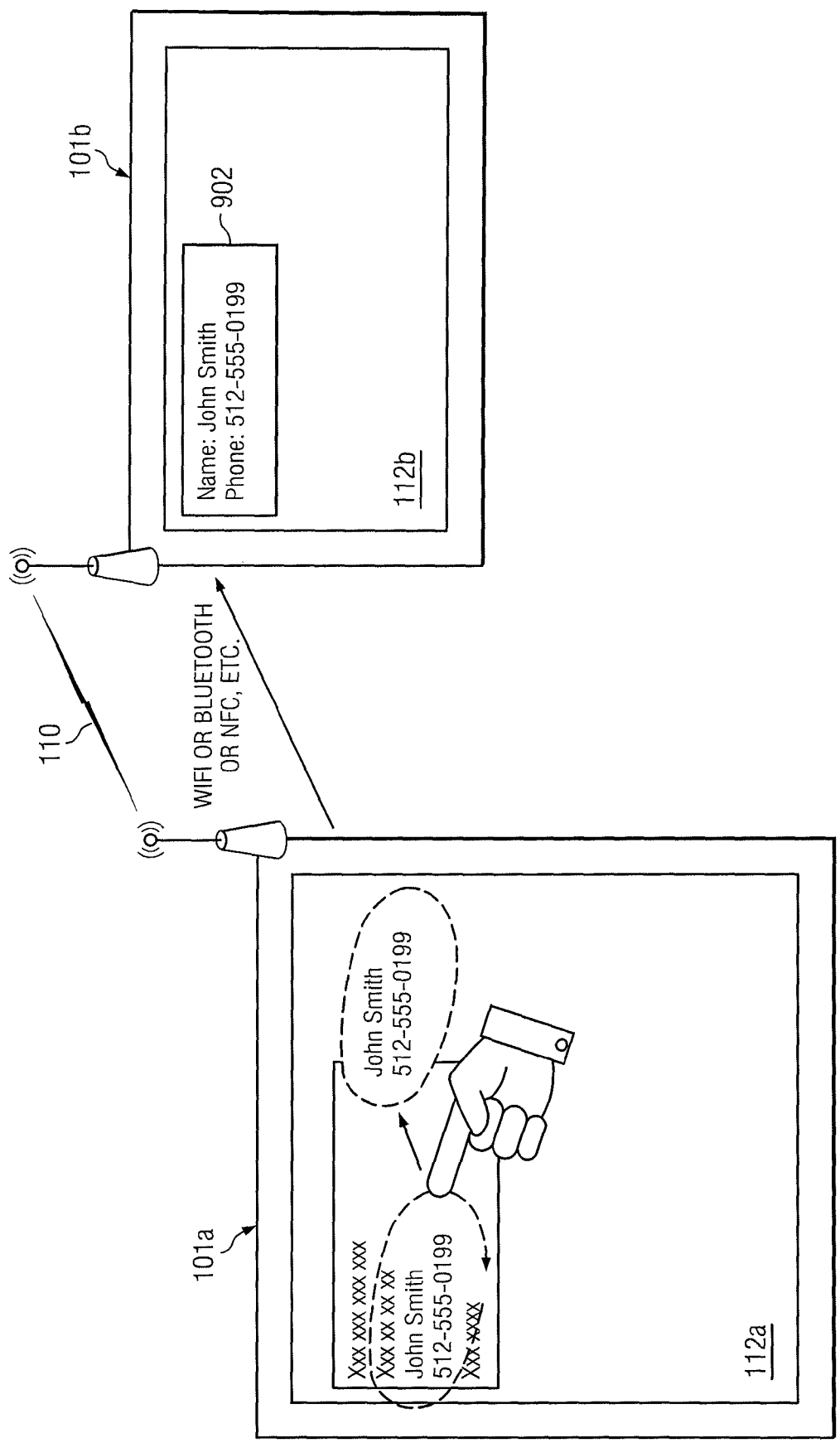
FIG. 9 illustrates an example method of transferring contact information from a telephonic conversation on a first client device to a second client device, in accordance with certain embodiments of the present disclosure.

FIG. 9 illustrates an example method of transferring contact information from a telephonic conversation on a first client device 101a to a second client device 101b, in accordance with certain embodiments of the present disclosure. As shown in FIG. 9, a user interacting with display 112a of first client device 101a may draw a geometric shape (e.g., circle, rectangle, etc.) around related graphical elements (in this example, graphical elements including the name and phone number for a person) to select such items in display 112a. Gesture detection module 218 may detect such action by the user and, in response, may cause parsing and display module 216 to determine that contact information has been selected in display 112a. As a result of a user dragging or flicking such items towards display 112b of second client device 101b, such information may be communicated via network 110 (e.g., via a Wireless Fidelity, Bluetooth, or near-field communication transport mechanism) and displayed as display element 902 on display 112b of second client device 101b.

Figure 10:
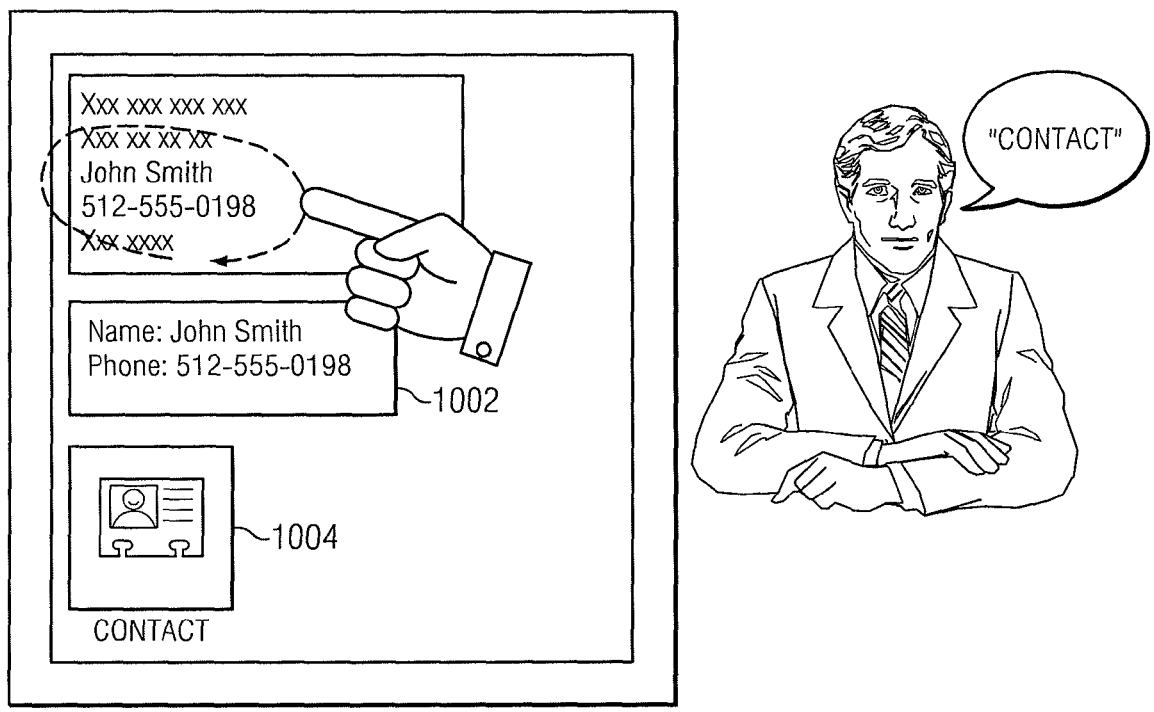
FIG. 10 illustrates another example method of inputting appointment information from a telephonic conversation to a client device, in accordance with certain embodiments of the present disclosure.

FIG. 10 illustrates another example method of inputting appointment information from a telephonic conversation to a client device, in accordance with certain embodiments of the present disclosure. As shown in FIG. 10, a user interacting with display 112 may draw a geometric shape (e.g., circle, rectangle, etc.) around related graphical elements (in this example, graphical elements including the name and phone number for a person) to select such items in display 112. A user may then speak the name of an application to apply to the selected data (e.g., "contact") and input assist module 114 may launch such application in response to the spoken command.

A component of system 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Versatile Disk (DVD)), database and/or network storage (for example, a server), and/or other computer-readable medium.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
converting voice data into text data;
tagging at least one portion of the text data with at least one tag, the at least one tag indicating that the at least one portion of the text data includes a particular type of data; and
displaying the text data on a display such that:
the at least one portion of text data is displayed with at least one associated graphical element indicating that the at least one portion of text data is associated with the at least one tag; and
the at least one portion of text data is a selectable item on the display allowing a user interfacing with the display to select the at least one portion of text data in order to apply the at least one portion of text data to an application;
wherein displaying the text data further includes displaying the text data on the display such that the at least one portion of text data is a draggable item on the display allowing a user interfacing with the display to drag the at least one portion of text data to a graphical element representing the application in order to apply the at least one portion of text data to the application.

2. The method according to claim 1, wherein the voice data is associated with a telephonic conversation.

3. The method according to claim 1, wherein tagging at least one portion of the text data includes:
referencing at least one database comprising one or more words; and
tagging the at least one portion of the text data in response to determining that the at least one portion of the text data includes at least one of the one or more words.

4. The method according to claim 1, wherein the particular type of data includes at least one of biographical information, geographical information, and temporal information.

5. The method according to claim 1, wherein the at least one associated graphical element includes at least one of highlighting, boldface, italics, underlining, and geometric shapes.

6. A device, comprising:
a processor;
a display communicatively coupled to the processor and configured to display images recognizable to a user; and
an input assist module communicatively coupled to the processor and configured to:
convert voice data into text data;
tag at least one portion of the text data with at least one tag, the at least one tag indicating that the at least one portion of the text data includes a particular type of data; and
display the text data on the display such that:
the at least one portion of text data is displayed with at least one associated graphical element indicating that the at least one portion of text data is associated with the at least one tag; and
the at least one portion of text data is a selectable item on the display allowing a user interfacing with the display to select the at least one portion of text data in order to apply the at least one portion of text data to an application;
wherein displaying the text data further includes displaying the text data on the display such that the at least one portion of text data is a draggable item on the display allowing a user interfacing with the display to drag the at least one portion of text data to a graphical element representing the application in order to apply the at least one portion of text data to the application.

7. The device according to claim 6, wherein the voice data is associated with a telephonic conversation.

8. The device according to claim 6, wherein the input assist module is configured to tag the at least one portion of the text data by:
referencing at least one database comprising one or more words; and
tagging the at least one portion of the text data in response to determining that the at least one portion of the text data includes at least one of the one or more words.

9. The device according to claim 6, wherein the particular type of data includes at least one of biographical information, geographical information, and temporal information.

10. The device according to claim 6, wherein the at least one associated graphical element includes at least one of highlighting, boldface, italics, underlining, and geometric shapes.

11. The device according to claim 6, wherein the device comprises one of a cellular phone, a smart phone, and a personal digital assistant.

12. A device, comprising:
a processor;
a display communicatively coupled to the processor and configured to display images recognizable to a user;
a first input assist module communicatively coupled to the processor; and
a network interface communicatively coupled to the processor and configured to couple a server to the device, the server having a second input assist module;
wherein the first input assist module and second input assist module are configured to, in the aggregate:
convert voice data into text data;
tag at least one portion of the text data with at least one tag, the at least one tag indicating that the at least one portion of the text data includes a particular type of data; and
display the text data on the display such that:
the at least one portion of text data is displayed with at least one associated graphical element indicating that the at least one portion of text data is associated with the at least one tag; and
the at least one portion of text data is a selectable item on the display allowing a user interfacing with the display to select the at least one portion of text data in order to apply the at least one portion of text data to an application;
wherein displaying the text data further includes displaying the text data on the display such that the at least one portion of text data is a draggable item on the display allowing a user interfacing with the display to drag the at least one portion of text data to a graphical element representing the application in order to apply the at least one portion of text data to the application.

13. The device according to claim 12, wherein the voice data is associated with a telephonic conversation.

14. The device according to claim 12, wherein the first input assist module and second input assist module are configured to tag the at least one portion of the text data by:
referencing at least one database comprising one or more words; and
tagging the at least one portion of the text data in response to determining that the at least one portion of the text data includes at least one of the one or more words.

15. The device according to claim 12, wherein the particular type of data includes at least one of biographical information, geographical information, and temporal information.

16. The device according to claim 12, wherein the at least one associated graphical element includes at least one of highlighting, boldface, italics, underlining, and geometric shapes.

17. The device according to claim 12, wherein the device comprises one of a cellular phone, a smart phone, and a personal digital assistant.

18. The method according to claim 1, wherein tagging at least one portion of the text data comprises detecting one or more patterns in the text data and tagging at least one portion of the text data based on such detected patterns.

19. The device according to claim 6, wherein the input assist module is configured to tag the at least one portion of the text data by detecting one or more patterns in the text data and tagging at least one portion of the text data based on such detected patterns.

20. The device according to claim 12, wherein the first input assist module and second input assist module are configured to tag the at least one portion of the text data by detecting one or more patterns in the text data and tagging at least one portion of the text data based on such detected patterns.

* * * * *